United States Patent [19]

Miyazono et al.

[11] Patent Number: 5,855,703
[45] Date of Patent: Jan. 5, 1999

[54] PNEUMATIC TIRES INCLUDING A TIRE COMPONENT CONTAINING GROUPS OF REINFORCING ELEMENTS IN TWO OR MORE STEPS AND ROWS

[75] Inventors: Toshiya Miyazono; Yoichi Okamoto, both of Kodaira, Japan

[73] Assignee: Bridgestone Corporation, Tokyo, Japan

[21] Appl. No.: 630,819

[22] Filed: Apr. 10, 1996

[51] Int. Cl.[6] .................. B60C 9/00; B60C 9/04; B60C 9/20; B60C 15/06
[52] U.S. Cl. .................. 152/527; 152/451; 152/526; 152/542; 152/543; 152/548; 152/556; 428/295.4
[58] Field of Search ................... 152/451, 526, 152/527, 530, 531, 536, 539, 542, 543, 548, 555–560, 563; 139/425 R; 428/295.4, 296.1

[56] References Cited

U.S. PATENT DOCUMENTS 1,608,102  11/1926  Jury ............................ 152/451 X

FOREIGN PATENT DOCUMENTS

| 0 470 835 A2 | 2/1992 | European Pat. Off. . | |
| 0 555 071 | 8/1993 | European Pat. Off. | 152/548 |
| 0 555 071 A1 | 8/1993 | European Pat. Off. . | |
| 4-95505 | 3/1992 | Japan . | |
| 5-278411 | 10/1993 | Japan . | |
| 7-96713 | 4/1995 | Japan | 152/526 |
| 7-96714 | 4/1995 | Japan | 152/526 |

*Primary Examiner*—Adrienne Johnstone
*Attorney, Agent, or Firm*—Sughrue, Mion, Zinn, Macpeak & Seas, PLLC

[57] ABSTRACT

A pneumatic tire comprises various tire components each comprised of a rubber-coated layer containing a given number of reinforcing elements. In at least one of these rubber-coated layers, not less than 30% of all reinforcing elements are divided into plural groups each comprised of a combination of m-steps and n-rows viewing in a thickness direction of the rubber-coated layer, in which each of m and n is an integer of 2 or more representing the number of the reinforcing elements, and a distance between mutually adjacent and opposite reinforcing elements not grouped with each other is wider than a distance between mutually adjacent reinforcing elements in the group.

4 Claims, 18 Drawing Sheets

FIG_1a COMPARATIVE
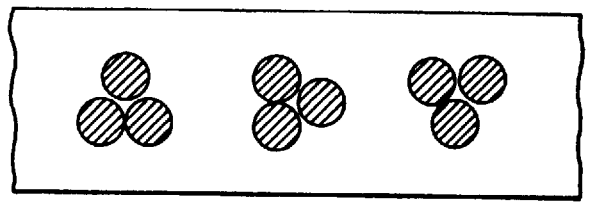
FIG_1b
COMPARATIVE
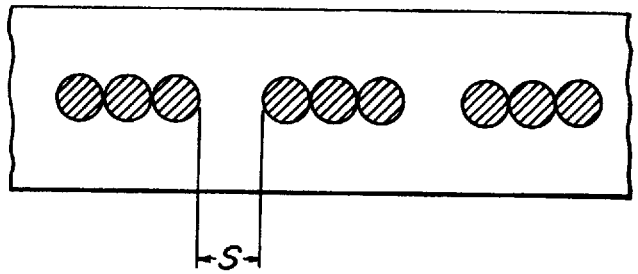
FIG_2
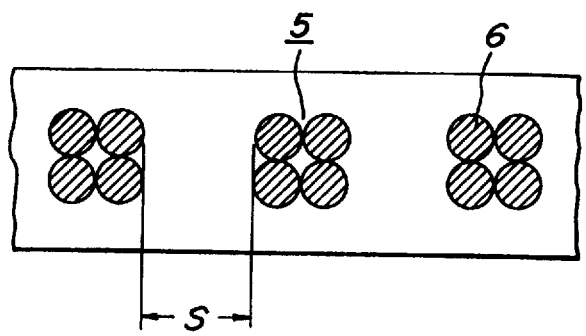

FIG._4
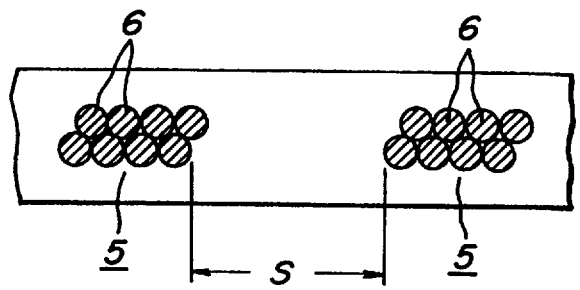
FIG._5 COMPARATIVE
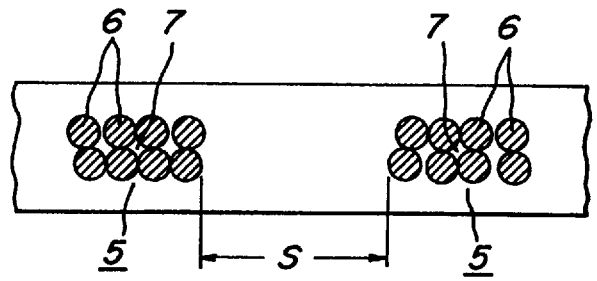
FIG._6
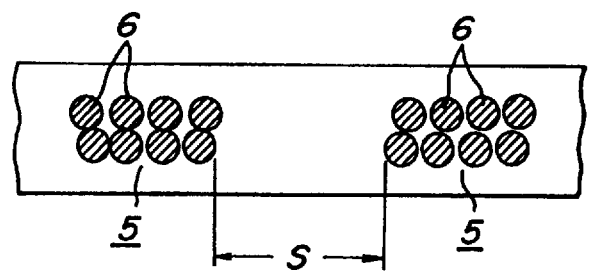

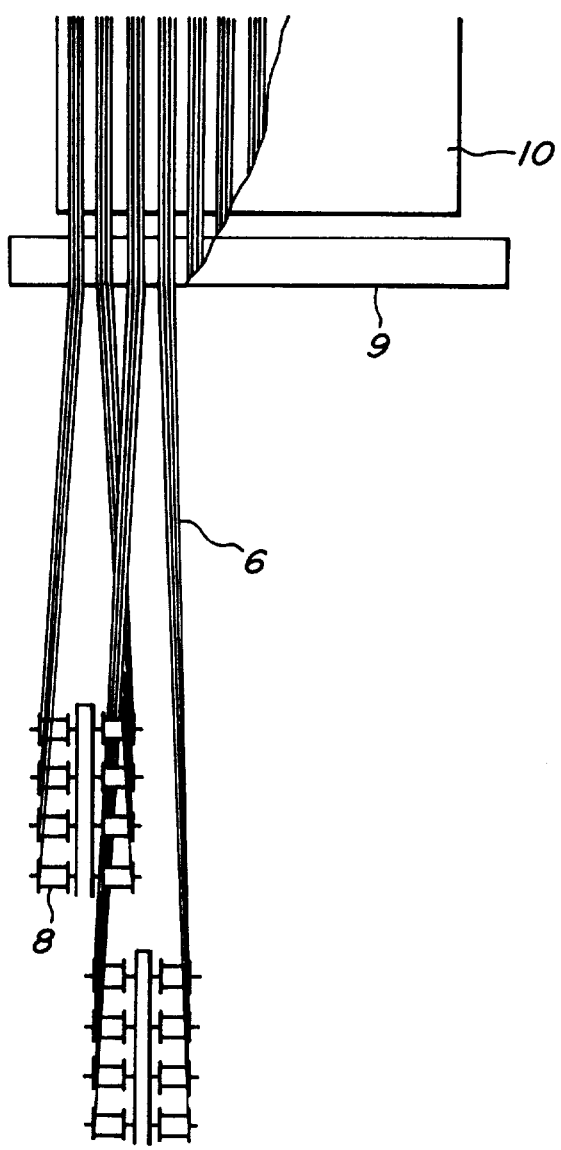

FIG_8
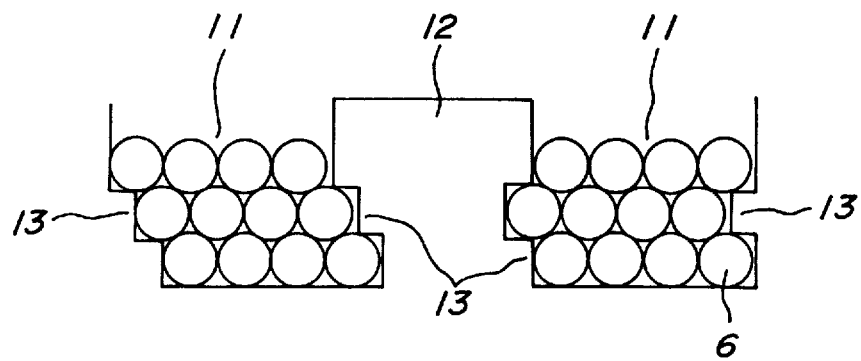

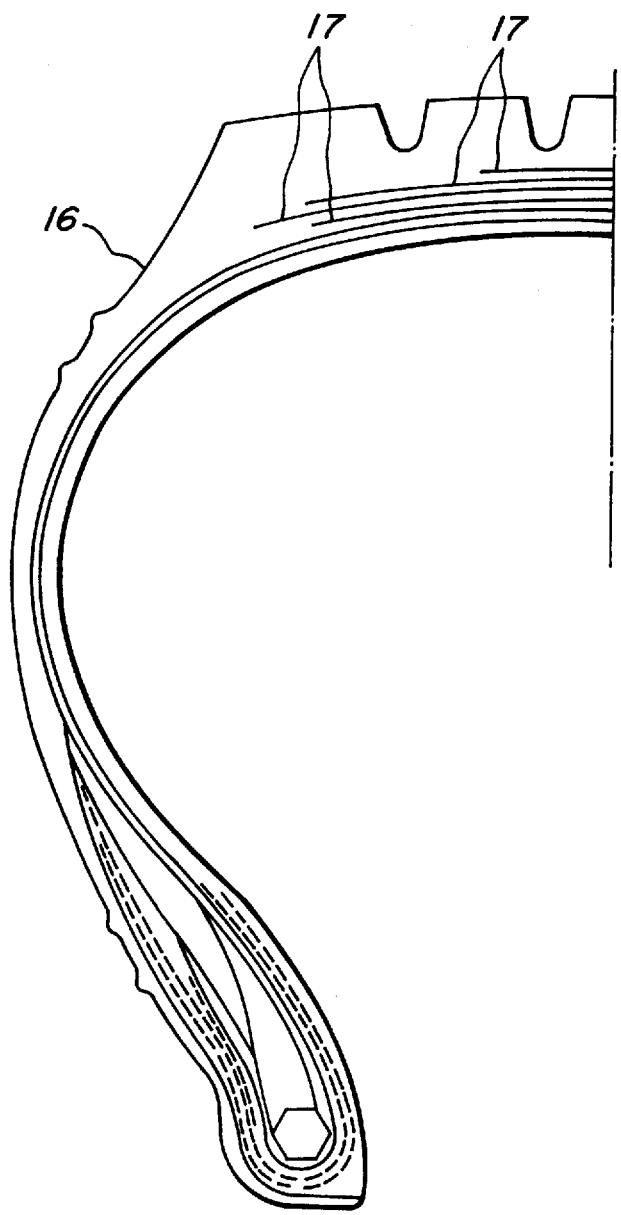
FIG_9

FIG_10
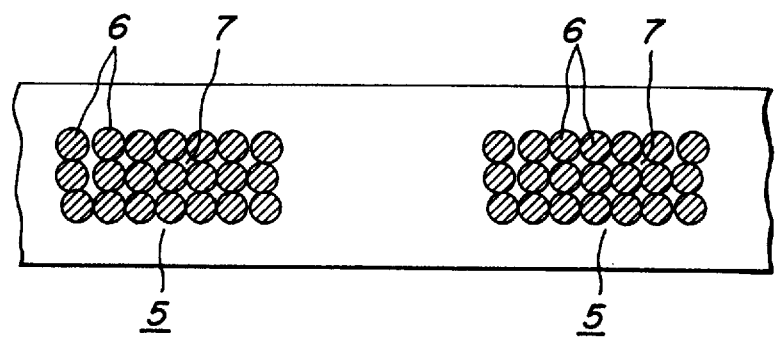
FIG_11
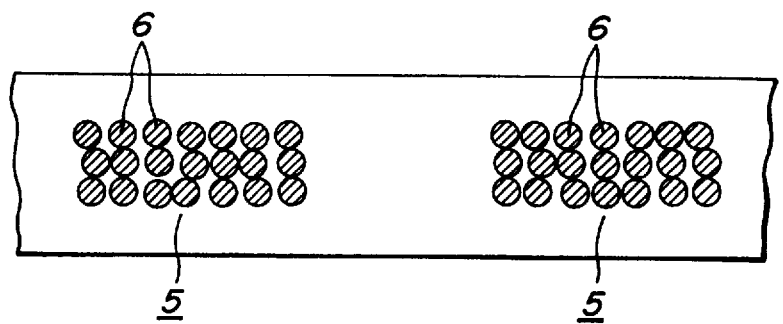

FIG_12 COMPARATIVE
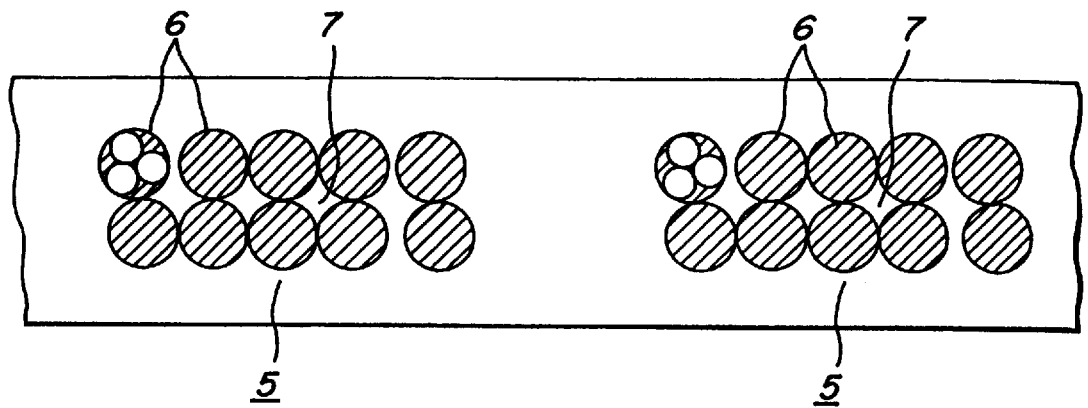
FIG_13
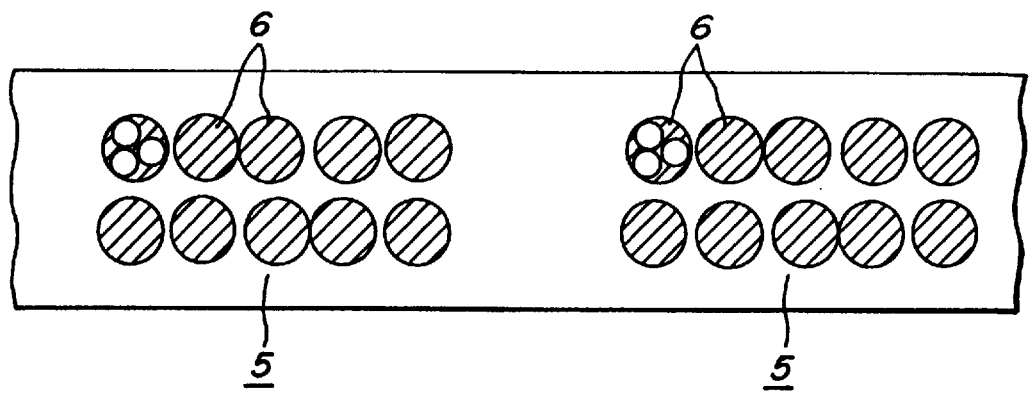

FIG_14
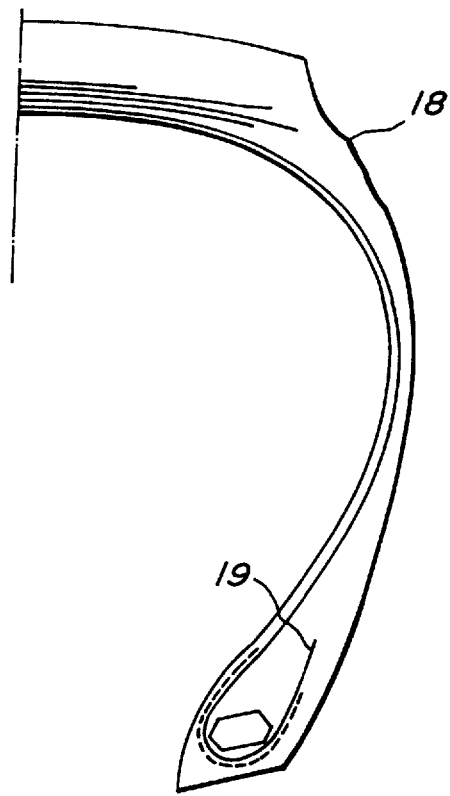

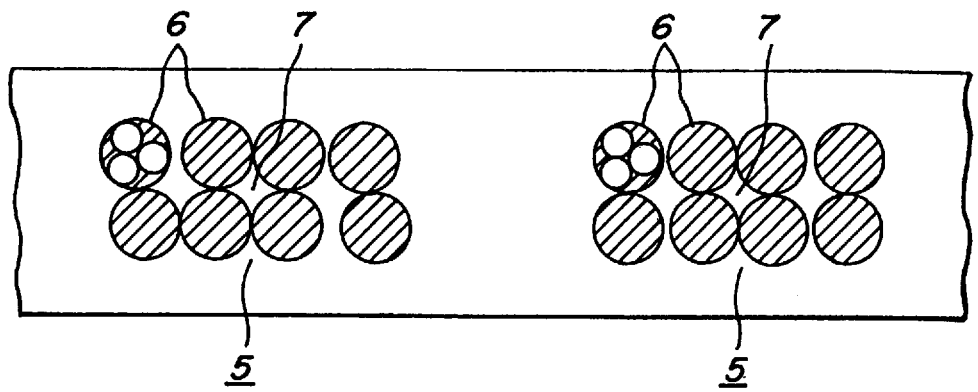
FIG_15 COMPARATIVE
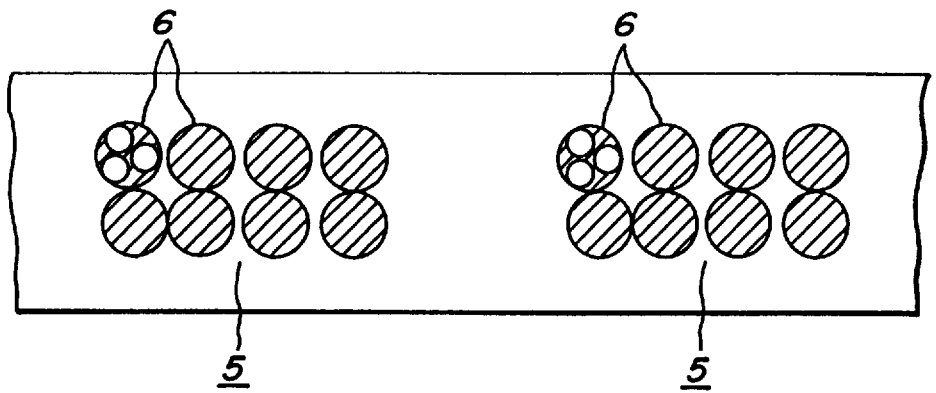
FIG_16

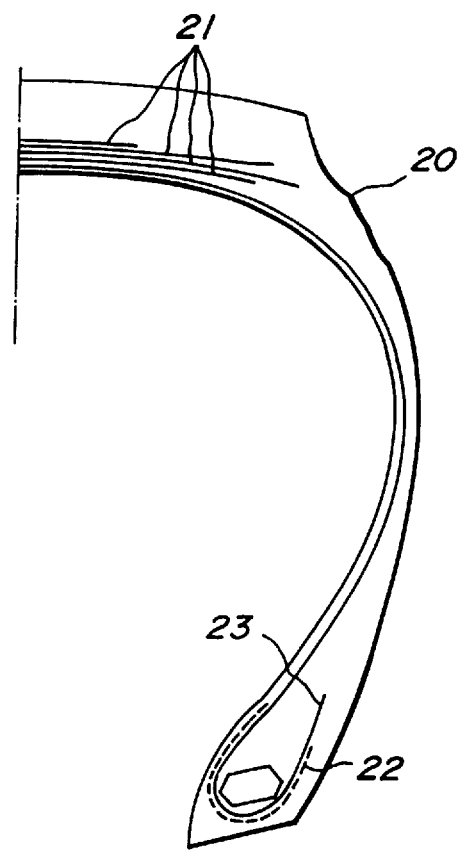
FIG_17

FIG_18 COMPARATIVE
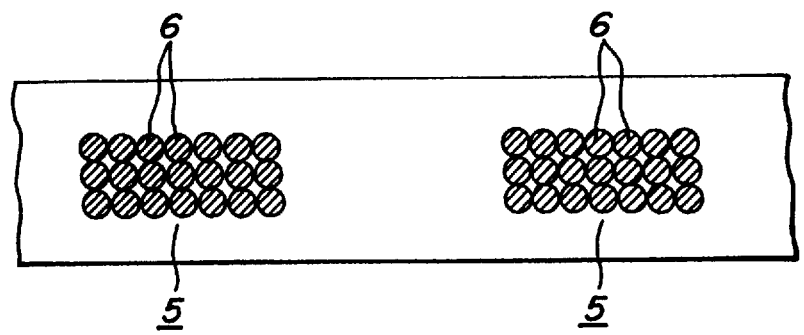
FIG_19
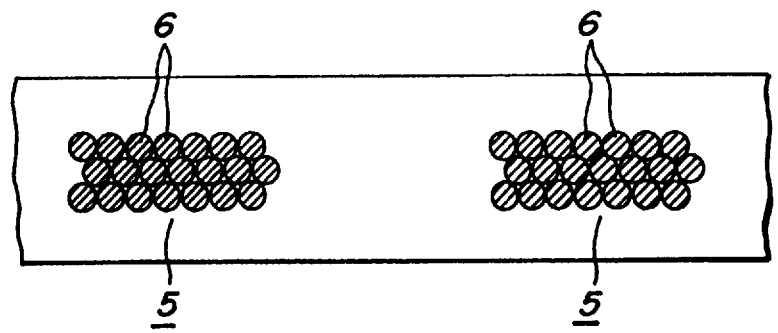

FIG_20 COMPARATIVE
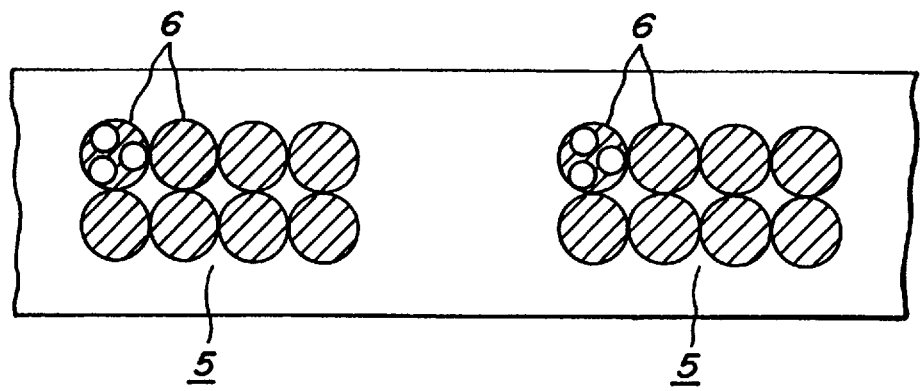
FIG_21
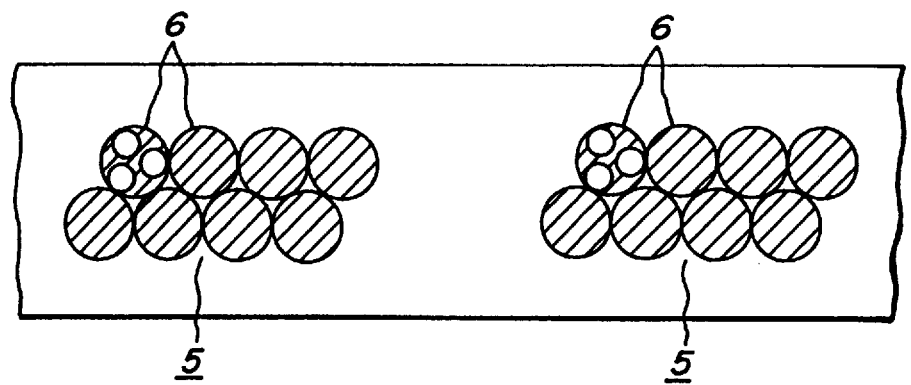

FIG. 22 COMPARATIVE
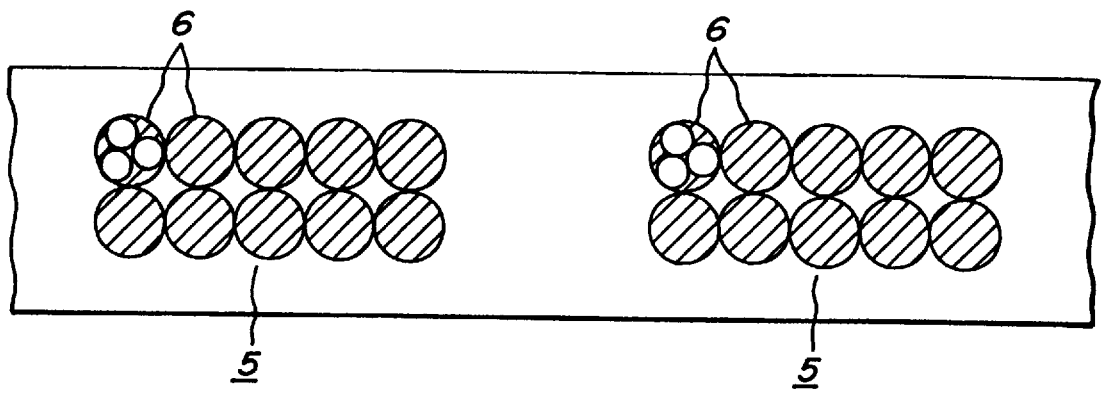
FIG. 23
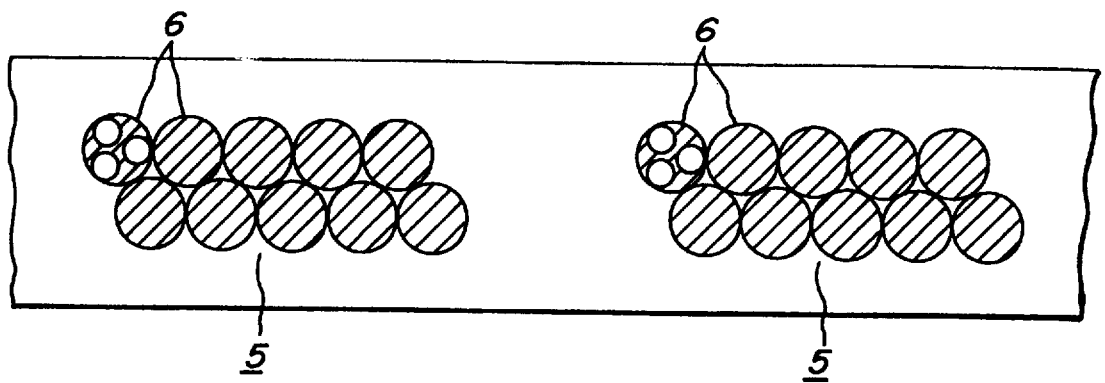

FIG. 24 COMPARATIVE
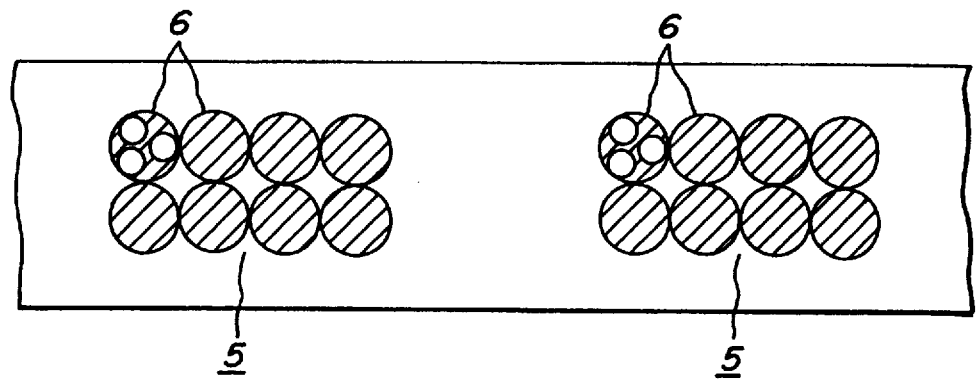
FIG. 25
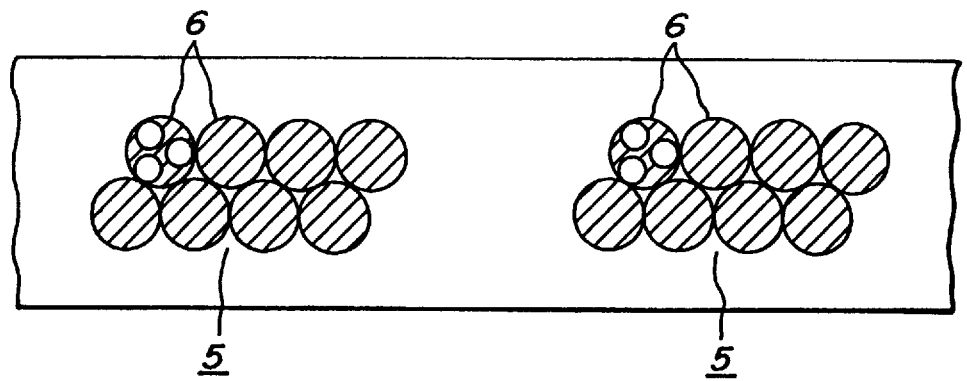

FIG_26
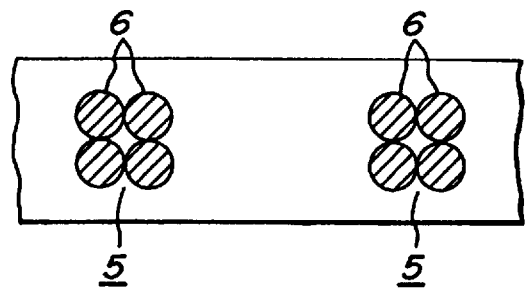
FIG_27 COMPARATIVE
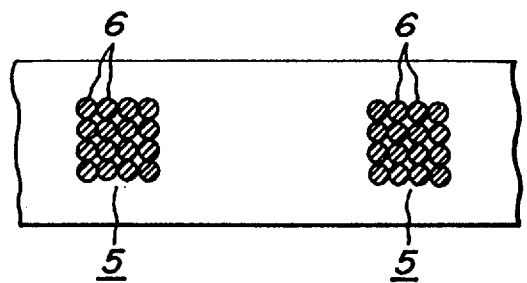
FIG_28
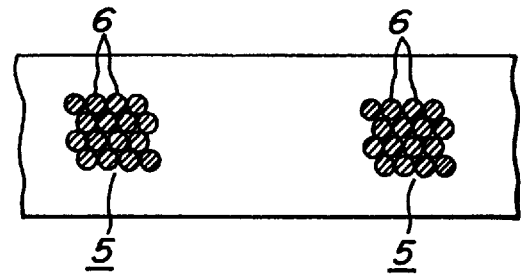

FIG. 29
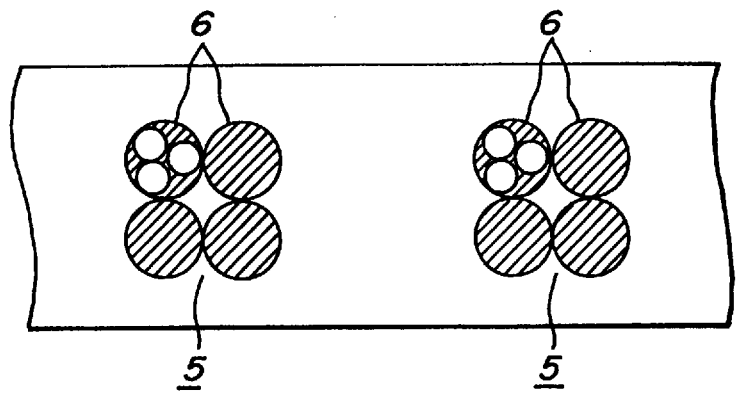
FIG. 30 COMPARATIVE
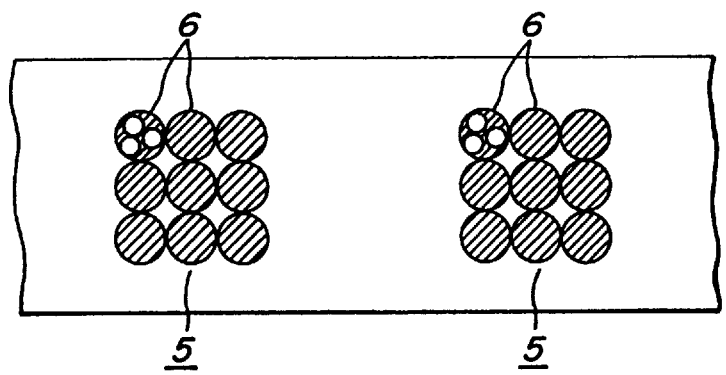
FIG. 31
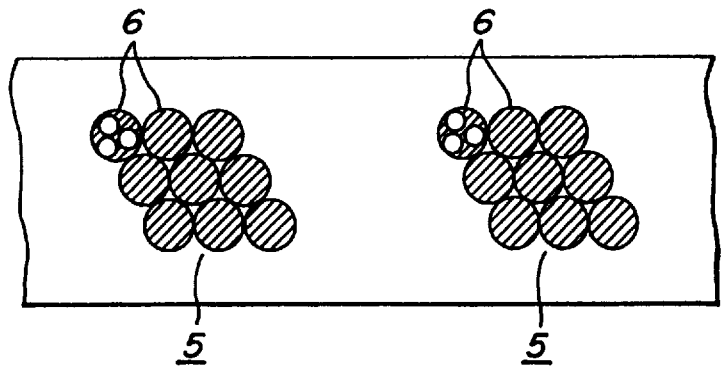

FIG_32
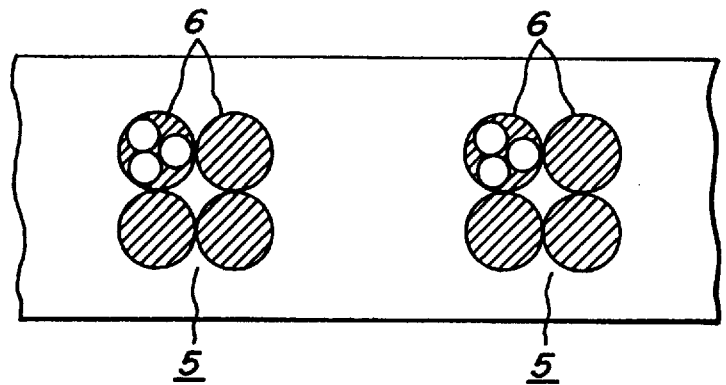
FIG_33 COMPARATIVE
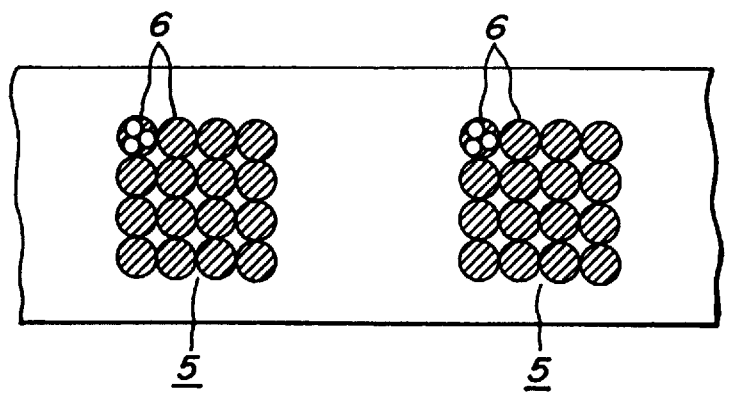
FIG_34
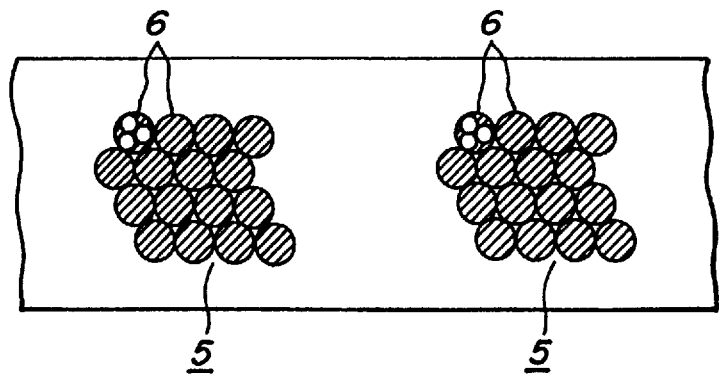

PNEUMATIC TIRES INCLUDING A TIRE COMPONENT CONTAINING GROUPS OF REINFORCING ELEMENTS IN TWO OR MORE STEPS AND ROWS

BACKGROUND OF THE INVENTION

1. Field of the Invention

This invention relates to pneumatic tires, and more particularly to a pneumatic radial tire having improved durability by improving components for tire skeleton and its reinforcement such as a belt serving to reinforce a tread portion, a turnup portion of a carcass ply and a bead portion reinforcing layer serving to reinforce a bead portion and the like.

2. Description of Related Art

As is well-known, the belt among the tire components serves to reinforce the tread portion and particularly acts to enhance the rigidity in the circumferential direction of the tire in case of a pneumatic radial tire. Furthermore, the carcass ply constitutes a skeleton of the tire and its turnup portion contributes to reinforce the bead portion. And also, the bead portion reinforcing layer restrains falling-down of the bead portion toward a rim flange brought about by contacting the ground for reinforcing the bead portion and it is usually arranged to extend from a neighborhood of a bead core or from inside of the tire around the bead core toward outside thereof in the radial direction of the tire along the turnup portion of the carcass ply at a position exceeding the turnup end.

In such tires, it is usual that a rubberized layer formed by embedding cords as a reinforcing element in rubber at equal spaces is used as the belt, carcass ply or bead portion reinforcing layer. That is, these reinforcing elements are arranged in parallel at a certain inclination angle with respect to an equator of the tire in case of the belt, at a certain inclination angle or right angle with respect to the equator in case of the carcass ply, and at a certain inclination angle with respect to the cord of the carcass ply in case of the bead portion reinforcing layer.

Among the conventional tire components each containing the reinforcing elements arranged parallel at equal spaces, when the tire component is used in the belt, rubber facing cut ends of the reinforcing elements is pierced by these reinforcing elements at the widthwise end of the belt due to the tire deformation during the contact with the ground to create fine cracking. Such cracking gradually grows between the adjacent reinforcing elements and then rapidly propagates between the mutually laminated belt layers constituting the belt to finally cause so-called belt separation failure. The propagation rate of the cracking until the occurrence of the belt separation failure is considerably fast, which is particularly a factor for determining the durability of the radial tire.

Furthermore, when the tire component is used in the carcass ply, rubber facing to cut ends of the reinforcing elements is pierced by these reinforcing elements at the turnup end of the carcass ply due to the tire deformation during the contact with ground to create fine cracking. Such cracking gradually grows between the adjacent reinforcing elements and then rapidly propagates toward a sidewall portion or a stiffener, which is a factor for determining the durability of the bead portion.

Similarly, when the tire component is used in the bead portion reinforcing layer, rubber facing cut ends of the reinforcing elements is pierced by these reinforcing elements at the axially outward or inward end of the bead portion reinforcing layer due to the tire deformation during the contact with ground to create fine cracking. Such cracking gradually grows between the adjacent bead portion reinforcing layers and then rapidly propagates toward the carcass ply or the outside of the tire, which is also a factor for determining the durability of the bead portion.

Therefore, it is important to control the growth of the cracking. For this purpose, it is advantageous to widen a distance between the mutually adjacent reinforcing elements. On the contrary, it is desired to reduce the diameter of the reinforcing element because the reduction of tire weight is strongly demanded and also the simplification of the cord used as the reinforcing element is required. As a result, in order to hold the same level of tire strength by using the reinforcing element of smaller diameter, it is naturally obliged to increase the end count of the reinforcing elements embedded in rubber and hence the distance between the mutually adjacent reinforcing elements is rather narrower, which conflicts with the control of cracking growth.

In JP-A-4-95505 is disclosed a tire structure wherein the growth and propagation of fine cracking created at rubber facing to cut ends of the reinforcing elements are controlled by dividing all reinforcing elements included in the rubberized layer into plural groups each comprised of several reinforcing elements to widen a distance between a group and the reinforcing element adjacent to this group but not included in this group. Furthermore, in order that this technique is particularly applied to steel cords having a simplified structure and the like, it is proposed in JP-A-5-278411 to render all reinforcing elements in each of the groups into at least two steps.

In this technique the number of reinforcing elements in the group is restricted to several elements in order to avoid the influence of cracking growth in the group. On the other hand, the distance between the group and the reinforcing element adjacent thereto and not included therein is further widened by further increasing the number of reinforcing elements constituting the group, whereby the growth and propagation of the cracking between the group and the reinforcing element can be controlled.

However, it is recently required to further improve tire durability from the viewpoint of a tendency of rendering a section profile of the tire into a low aspect ratio and a demand of commercially prolonging a service life of the tire (inclusive of a retread tire).

SUMMARY OF THE INVENTION

It is, therefore, an object of the invention to provide pneumatic tires provided with an improved tire component capable of solving the above problems when reinforcing elements constituting the tire component are divided into plural groups and the reinforcing elements included in each group are arranged into at least two-steps or more for improving the durability.

According to the invention, there is the provision of a pneumatic tire comprising various tire components each comprised of a rubber-coated layer containing a given number of reinforcing elements separately arranged in parallel with each other therein, wherein the reinforcing elements corresponding to not less than 30% of all reinforcing elements included in at least one of the rubber-coated layers are divided into plural groups each consisting of a combination of m-steps and n-rows viewing in a thickness direction of the rubber-coated layers, in which m is an integer of 2 or more and n is an integer of three or more representing the number of the reinforcing elements, a distance between mutually adjacent and opposite reinforcing elements, which are not grouped with each other, is wider than a distance between mutually adjacent reinforcing elements in the group and distances between any four mutually adjacent reinforcing elements within each of said groups are not the same in all of said groups.

BRIEF DESCRIPTION OF THE DRAWINGS

FIG. 1a is a diagrammatical view illustrating a first comparative arrangement of reinforcing elements in a rubber-coated layer;

FIG. 1b is a diagrammatical view illustrating a deformed state of the reinforcing element arrangement shown in FIG. 1a;

FIG. 2 is a diagrammatical view partly shown in section of a first embodiment of the rubber-coated layer according to the invention;

FIG. 4 is a diagrammatical view partly shown in section of a second embodiment of the rubber-coated layer according to the invention;

FIG. 5 is a diagrammatical view illustrating a second comparative arrangement of reinforcing elements in a rubber-coated layer;

FIG. 6 is a diagrammatical view partly shown in section of a third embodiment of the rubber-coated layer according to the invention;

FIG. 7 is a schematic view illustrating the production of a treat for the rubber-coated layer;

FIG. 8 is a schematic view illustrating the arrangement of reinforcing elements in a calender roll of comb teeth shape;

FIG. 9 is a diagrammatically radial-half section view of a second embodiment of the pneumatic tire according to the invention;

FIG. 10 is a diagrammatical view illustrating a third comparative arrangement of reinforcing elements in a rubber-coated layer;

FIG. 11 is a diagrammatical view partly shown in section of a fourth embodiment of the rubber-coated layer according to the invention;

FIG. 12 is a diagrammatical view illustrating a fourth comparative arrangement of reinforcing elements in a rubber-coated layer;

FIG. 13 is a diagrammatical view partly shown in section of a fifth embodiment of the rubber-coated layer according to the invention;

FIG. 14 is a diagrammatically radial-half section view of a third embodiment of the pneumatic tire according to the invention;

FIG. 15 is a diagrammatical view illustrating a fifth comparative arrangement of reinforcing elements in a rubber-coated layer;

FIG. 16 is a diagrammatical view partly shown in section of a sixth embodiment of the rubber-coated layer according to the invention;

FIG. 17 is a diagrammatically radial-half section view of a fourth embodiment of the pneumatic tire according to the invention;

FIG. 18 is a diagrammatical view illustrating a sixth comparative arrangement of reinforcing elements in a rubber-coated layer;

FIG. 19 is a diagrammatical view partly shown in section of a seventh embodiment of the rubber-coated layer according to the invention;

FIG. 20 is a diagrammatical view illustrating a seventh comparative arrangement of reinforcing elements in a rubber-coated layer;

FIG. 21 is a diagrammatical view partly shown in section of an eighth embodiment of the rubber-coated layer according to the invention;

FIG. 22 is a diagrammatical view illustrating an eighth comparative arrangement of reinforcing elements in a rubber-coated layer;

FIG. 23 is a diagrammatical view partly shown in section of a ninth embodiment of the rubber-coated layer according to the invention;

FIG. 24 is a diagrammatical view illustrating a ninth comparative arrangement of reinforcing elements in a rubber-coated layer;

FIG. 25 is a diagrammatical view partly shown in section of a tenth embodiment of the rubber-coated layer according to the invention;

FIG. 26 is a diagrammatical view partly shown in section of an eleventh embodiment of the rubber-coated layer according to the invention;

FIG. 27 is a diagrammatical view illustrating a tenth comparative arrangement of reinforcing elements in a rubber-coated layer;

FIG. 28 is a diagrammatical view partly shown in section of a twelfth embodiment of the rubber-coated layer according to the invention;

FIG. 29 is a diagrammatical view partly shown in section of a thirteenth embodiment of the rubber-coated layer according to the invention;

FIG. 30 is a diagrammatical view illustrating an eleventh comparative arrangement of reinforcing elements in a rubber-coated layer;

FIG. 31 is a diagrammatical view partly shown in section of a fourteenth embodiment of the rubber-coated layer according to the invention;

FIG. 32 is a diagrammatical view partly shown in section of a fifteenth embodiment of the rubber-coated layer according to the invention;

FIG. 33 is a diagrammatical view illustrating a twelfth comparative arrangement of reinforcing elements in a rubber-coated layer; and FIG. 34 is a diagrammatical view partly shown in section of a sixteenth embodiment of the rubber-coated layer according to the invention.

Figure 3:
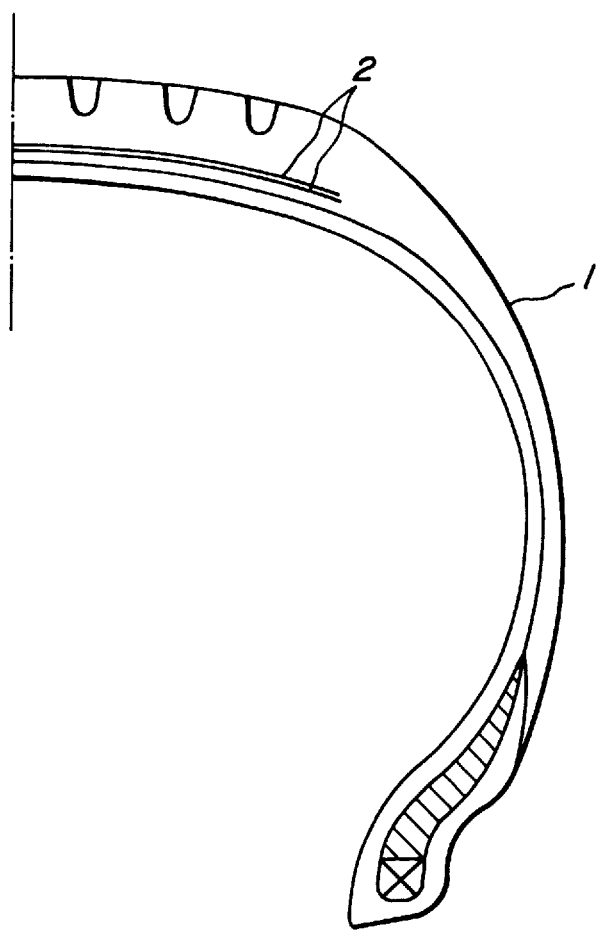
FIG. 3 is a diagrammatically radial-half section view of a first embodiment of the pneumatic tire according to the invention.

Throughout the drawings, the tire component is schematically and partially shown at a section perpendicular to the longitudinal direction of the reinforcing element.

DESCRIPTION OF THE PREFERRED EMBODIMENTS

As previously proposed in JP-A-5-278411, it is effective that the reinforcing elements included in each group are arranged in at least two steps for improving the durability by dividing the reinforcing elements in the tire component into plural groups. If it is intended to further improve durability, however, it is desirable that the distance between the mutually reinforcing elements of the groups is made wider by rendering the number of the reinforcing elements included in the group into 3 or more when the reinforcing elements in the group are arranged in at least 2-steps. However, it has been confirmed that when three reinforcing elements in the group are arranged in form of 2+1 or 1+2 structure as shown in FIG. 1a, they are partially or wholly crushed into a form of 1-step and 3-rows by a stitcher roll for pressing each tire component for carcass ply, belt, tread or the like at a tire building step or under a high pressure in vulcanization as shown in FIG. 1b, and consequently the distance S between the mutually adjacent reinforcing elements of the groups is rather decreased.

In order to solve the above problem, according to the invention, the reinforcing elements included in the rubber-coated layer are divided into plural groups comprised of a combination of m-steps and n-rows viewed in a thickness direction of the rubber-coated layer, whereby a distance between mutually adjacent and opposite reinforcing elements, which are not grouped with each other, is wider than a distance between mutually adjacent reinforcing elements in the group and distances between any four mutually adjacent reinforcing elements within each of said groups are not the same in all of said groups. When each of m and n is 2 or more, each of steps and rows in the group includes 2 or more reinforcing elements, so that the movement of the reinforcing elements in each step or each row is restrained even under the above high pressure, and hence the crushing of the group can effectively be controlled.

In the invention, the tire component includes the following: a belt serving to reinforce a tread portion, at least one carcass ply wound around each of a pair of bead cores from an inside of the tire toward an outside thereof, at least one bead portion reinforcing layer folded about each bead core from the inside of the tire toward the outside thereof and extending along the turnup portion of the carcass ply upward in the radial direction of the tire and, a belt reinforcing layer covering a part or a full width of the belt and the like.

As a material of the reinforcing element, use may advantageously be made of steel cords or steel monofilaments usually used in the manufacture of pneumatic radial tires.

Furthermore, the number of the reinforcing elements is the same in the groups, or the number of the reinforcing elements is different in the groups. Moreover, a distance between the adjacent reinforcing elements in the group is narrower than the distance between the mutually adjacent and opposite reinforcing elements not grouped with each other.

When all of the reinforcing elements in the rubber-coated layer are divided into plural groups containing a given number of the reinforcing elements, if few reinforcing elements are left over these groups in accordance with the total reinforcing element number required for the formation of tire skeleton or its reinforcement, these remaining reinforcing elements may be arranged substantially at a space equal to the distance between the mutually adjacent and opposite reinforcing elements not grouped with each other.

However, shearing stress is created between the steps of the group through a shearing stress in circumferential direction produced during the rotation of the tire as typified by a shearing stress created between two laminated belt layers, the reinforcing elements of which layers being crossed with each other, whereby the restraint of the group is disturbed to cause slipping-off between the steps.

When the reinforcing elements in the group are arranged in 2-steps and 2-rows, rubber located between the reinforcing elements of the groups suppresses the above slipping-off without problem. However, when the number of reinforcing elements in the group is increased to form a group of 2-steps and 3-rows or more, the suppressing effect by rubber adjacent to the group is insufficient due to the increase of the reinforcing element number subjected to the circumferential shearing force. Hence, the slipping-off between the steps undesirably increases, from which cracking is created and easily grows across the group and finally brings about the cracking growth between the group and the reinforcing element adjacent thereto but not included therein.

In order to solve this problem, according to a first preferable embodiment of the invention, when the reinforcing elements corresponding to not less than 30% of all reinforcing elements included in the rubber-coated layer are divided into plural groups each comprised of a combination of at least 2-steps and 3-rows in the thickness direction of the layer, the adjacent 2-steps in the group are shifted with each other so as to locate each of the reinforcing elements in one of the 2-steps between adjacent reinforcing elements in the other step.

On the other hand, when the number of reinforcing elements in the group is more increased and particularly rendered into a combination of 2-steps or more and 4-rows or more, a closed space is defined among these reinforcing elements of the group and it is naturally difficult to penetrate rubber into the inside of the closed space. As a result, if water penetrates into the inside of the closed space through cut failure from an exterior of the tire, it arrives at cut ends of the reinforcing elements. When the reinforcing elements are used in the belt, the separation failure is caused at cut ends of these reinforcing elements. When they are used in the carcass ply, corrosion of the reinforcing element occurs over a wide region along the closed space to continuously peel rubber from the reinforcing element in the longitudinal direction thereof and finally the sidewall portion of the tire is swelled outward and the tire fails.

In order to solve this problem, according to a second preferable embodiment of the invention, when the reinforcing elements corresponding to not less than 30% of all reinforcing elements included in the rubber-coated layer are divided into plural groups each comprised of a combination of at least 2-steps and 4-rows in the thickness direction of the layer, at least one non-contact region communicating to an outside of the group is formed among adjacent four reinforcing elements constituting a combination of 2-steps and 2-rows in the group.

As previously mentioned, the rubber breakage at cut ends of the reinforcing elements in the tire component is based on the fine cracking created by repeatedly piercing the reinforcing elements into rubber facing the cut ends of the reinforcing elements every the tire deformation and grown along the surface of the reinforcing element. Apart from such an initial stage, when the reinforcing elements are separately arranged in parallel with each other at equal spaces according to the conventional technique, the cracking immediately starts to grow across the mutually adjacent reinforcing elements and rapidly propagates between laminated rubber-coated layers as the tire component or toward the inside of the tire about the tire component to cause various separation failures, crackings and the like.

On the contrary, according to the invention, a ply as shown in FIG. 2 or a ply containing plural groups 5 each comprised of 2-steps and 2-rows made from reinforcing elements 6 is applied to a belt 2 of a pneumatic radial tire 1 as shown in FIG. 3, in which a distance S between mutually adjacent and opposite reinforcing elements 6 not grouped with each other is fairly widened as compared with a case that all reinforcing elements 6 included in the ply are arranged at equal spaces looking at a side end of the belt. As a result, the growth of the cracking after the initial cracking stage between the adjacent reinforcing elements 6 is delayed in accordance with the distance S between the mutually adjacent and opposite reinforcing elements 6, whereby the rapid propagation to separation and cracking failures is effectively controlled. Moreover, as the rigidity of the reinforcing element becomes high, fine cracking is apt to be prematurely caused by picking the rubber with the cut ends of the reinforcing elements. When the invention is applied to high rigidity reinforcing elements such as steel cord or the like, the effect of controlling the rapid propagation to separation failure becomes more conspicuous.

Moreover, even when only the reinforcing elements corresponding to less than 30% of all reinforcing elements included in the rubber-coated layer are divided into groups each comprised of some reinforcing elements, the distance between the mutually adjacent and opposite reinforcing elements becomes somewhat wider than the distance between the adjacent reinforcing elements if all reinforcing elements are arranged at equal spaces in the rubber-coated layer. As a result, the occurrence of separation and cracking failures can be prevented, but it can not be said that the control effect is too high. Such an effect becomes first conspicuous when the reinforcing elements corresponding to at least 30% of all reinforcing elements in the rubber-coated layer are divided into plural groups.

According to the invention, in the formation of the group comprised of a combination of at least 2-steps and 3-rows, the upper step and the lower step are shifted with each other. For example, as shown in FIG. 4, the reinforcing elements 6 of the upper step are placed between the reinforcing elements 6 of the lower step in the group 5 comprised of 2-steps and 4-rows, whereby the movement of each step in the group 5 can be controlled by the restraint between the steps to avoid the occurrence of cracking between the steps. Particularly, in the group comprised of 2-steps and 3-rows, rubber flows in the widthwise direction of the rubber-coated layer by applying pressure from a bladder during the vulcanization and the reinforcing elements in the group are moved accompanied therewith and hence the closed space is not formed among the reinforcing elements between the upper and lower steps.

On the contrary, when the group is comprised of a combination of 2-steps or more and 4-rows or more, a closed space 7 is easily formed as shown in FIG. 5. According to the invention, therefore, at least one non-contact region communicating to an outside of the group 5 is formed among adjacent four reinforcing elements 6 constituting a combination of 2-steps and 4-rows in the group 5 as shown in FIG. 6. As a result, the closed space is never formed in the group comprised of 2-steps and 4-rows according to the invention and the penetration of water into the closed space is not caused, so that the separation failure between rubber and the group is not induced.

In order to provide the rubber-coated layer containing a given number of reinforcing elements as a tire component according to the invention, as shown in FIG. 7, the reinforcing elements 6 such as steel cords or steel monofilaments are taken out from respective spools 8 and then passed through a calender roll of improved comb teeth shape to prepare a ply 10. The calender roll 9 serves to cover the reinforcing elements 6 of every group of at least 4 reinforcing elements with rubber as shown in FIG. 2.

As shown in FIG. 8, the calender roll 9 is provided with a plurality of circumferential grooves 11 for grouping the reinforcing elements 6. The circumferential grooves 11 are defined by a collar-like teeth 12 for separating the adjacent groups apart from each other. Furthermore, each of the circumferential grooves 11 is provided with a step-like or uneven side wall 13 for shifting the steps of the group with each other as shown, for example, in FIG. 4. When the thus obtained ply 10 is used as a tire component, it is slantly cut to incline the reinforcing elements at a given angle with respect to an equatorial plane of a tire and then the cut plies are rejoined at their cut ends to form a rubber strip for supplying to a tire building-up step.

The following examples are given in illustration of the invention and are not intended as limitations thereof.

EXAMPLE 1

A pneumatic radial tire for a passenger car having a tire size of 185/70R14 as shown in FIG. 3 is manufactured by using a belt ply shown in FIG. 2 as a belt 2 for reinforcing a tread of this tire. In the belt ply, plural groups of 2-steps and 2-rows made from 4 steel monofilaments each having a filament diameter of 0.2 mm as a reinforcing element are arranged at a distance S between the groups of 2.37 mm, in which an end count is 18.0 groups per 50 mm.

In the tire of FIG. 3, the belt 2 is comprised of two belt layers in which the monofilaments of these two belt layers are crossed with each other at an inclination angle of 20° with respect to an equatorial plane of the tire and a width of the lower belt layer is somewhat wider than that of the upper belt layer.

COMPARATIVE EXAMPLE 1

The same tire as in Example 1 is manufactured by using a belt ply containing groups each comprised of 3 steel monofilaments of 0.2 mm in diameter as shown in FIG. 1$a$ in the belt. After vulcanization, each of the groups shown in FIG. 1$a$ is changed into a group shown in FIG. 1$b$. In the product tire, the distance S between the groups as shown in FIG. 1$b$ is 1.48 mm and the end count is 24.0 groups per 50 mm.

COMPARATIVE EXAMPLE 2

The same tire as in Example 1 is manufactured except that a belt ply containing a given number of monofilaments of 0.2 mm in diameter is arranged at equal distances of 0.49 mm over the full circumference of the belt without grouping is used in the belt. In this case, the end count is 72.0 monofilaments per 50 mm.

Each of the above tires in Example 1 and Comparative Examples 1 and 2 is inflated under an internal pressure of 2.0 kgf/cm$^2$ and mounted onto a passenger car, which is then run over a distance of 50,000 km and thereafter a state of belt end in the tire is observed.

As a result, only a fine pecked cracking is created at the belt end in the tire of Example 1 in the longitudinal direction of the reinforcing element but is actually difficult in measurement, while the length of cracking created at the belt end is 2 mm at maximum in Comparative Example 1 and 5 mm at maximum in Comparative Example 2.

EXAMPLE 2

A pneumatic radial tire for a passenger car having a tire size of 185/70R14 as shown in FIG. 3 is manufactured by using a belt ply shown in FIG. 4 in a belt 2 for reinforcing a tread of this tire. In the belt ply, plural groups of 2-steps and 4-rows made from 8 steel monofilaments each having a filament diameter of 0.2 mm as a reinforcing element are arranged at a distance S between the groups of 1.18 mm, in which an end count is 24.0 groups per 50 mm.

In the tire of FIG. 3, the belt 2 is comprised of two belt layers in which the monofilaments of these two belt layers are crossed with each other at an inclination angle of 20° with respect to an equatorial plane of the tire and a width of the lower belt layer is somewhat wider than that of the upper belt layer.

For the comparison, a belt ply having a closed space 7 as shown in FIG. 5 is used in the belt instead of the belt ply shown in FIG. 4.

Each of the above two tires is inflated under an internal pressure of 2.0 kgf/cm² and is mounted onto a passenger car, which is then run over a distance of 50,000 km and thereafter a cracking state of rubber is observed over a region ranging from a ground contact surface of the tread suffered by cut failure to an end of belt in the longitudinal direction of the monofilament.

In the tire of Example 2, the cut failure is created at five positions of the tread surface, but the separation failure is not caused at any positions corresponding to these cut portions and also a length of cracking created along the monofilament is only 3 mm.

On the other hand, the cut failure is created at five positions of the tread surface in the comparative tire, in which the occurrence of rust powder is observed at all of these cut portions. Further, the ends of the monofilaments in the belt are abraded and the separation failure is spreaded toward the adjacent group, in which the maximum length of the separation failure is 20 mm in the longitudinal direction of the monofilament and 40 mm in the arranging direction of the groups.

EXAMPLE 3

A pneumatic radial tire 16 for truck and bus having a tire size of 10.00R20 as shown in FIG. 9 is manufactured by using a belt ply as shown in FIGS. 10–13 in a belt 17 of the tire according to a specification as shown in Table 1. Each of the resulting tires is inflated under an internal pressure of 7.25 kgf/cm² and actually run over a distance of 100,000 km and thereafter a cracking state of rubber is observed over a region ranging from a ground contact surface of the tread suffered by cut failure to an end of belt in the longitudinal direction of the monofilament or cord. The results are also shown in Table 1. Moreover, the belt 17 of this tire is comprised of four belt layers in which the reinforcing elements of first to fourth belt layers viewing from the tread side are arranged at inclination angles of 18° upward to the left, 18° upward to the left, 18° upward to the right and 52° upward to the right with respect to the equatorial plane of the tire, respectively.

TABLE 1

| Reinforcing element | Arrangement | End count (groups/50 mm) | Distance S between groups (max:mm) | Number of cut failures | Results | Remarks |
| --- | --- | --- | --- | --- | --- | --- |
| monofilament of 0.21 mm in diameter | 3-steps and 7-rows (21 mono-filaments) | 17.8 17.8 | 1.24 | 5 | Occurrence of separation failure (maximum: 25 × 45 mm) | Comparative Example, FIG. 10 |
| | | 17.8 17.8 | 1.12 | 6 | Cracking along reinforcing element (pecking degree: 3 mm) | Acceptable Example, FIG. 11 |
| steel cord of 1 × 3 × 0.2 mm | 2-steps and 5-rows (10 cords) | 14.1 14.1 | 1.32 | 7 | Occurrence of separation failure (maximum: 30 × 40 mm) | Comparative Example, FIG. 12 |
| | | 14.1 14.1 | 1.32 | 6 | Cracking along reinforcing element (pecking degree: 2 mm) | Acceptable Example, FIG. 13 |

EXAMPLE 4

A pneumatic radial tire 18 for truck and bus having a tire size of 11R22.5 as shown in FIG. 14 is manufactured by using a ply as shown in FIG. 15 or 16 in a carcass ply 19 of the tire. In the plies of FIGS. 15 and 16, plural groups each comprised of a combination of 2-steps and 4-rows made from 8 steel cords of 1×3×0.19 mm as a reinforcing element are arranged at a distance between the groups of 1.19 mm, in which the end count is 17.2 cords per 50 mm.

Each of the above two tires is inflated under an internal pressure of 7.0 kgf/cm² and actually run over a distance of 100,000 km and thereafter a cracking state of rubber is observed over a region ranging from a ground contact surface of the tread suffered by cut failure to an end of belt in the longitudinal direction of the cord.

In the tire of Example 4 using the ply shown in FIG. 16, the cut failure is created at two positions of the tread surface, but the occurrence of corrosion is observed only at a region of about 1 mm in the vicinity of the cut portion.

On the other hand, the cut failure is created at two positions of the tread surface in the comparative tire using the ply shown in FIG. 15, in which the occurrence of rust powder is observed at all of these cut portions and corrosion is created over a region of 25 mm to 30 mm around the cut portion in the longitudinal direction of the cord.

EXAMPLE 5

A pneumatic radial tire for a passenger car having a tire size of 185/70R14 as shown in FIG. 3 is manufactured by using a belt ply shown in FIG. 6 as a belt 2 for reinforcing a tread of this tire. In the belt ply, plural groups of 2-steps and 4-rows made from 8 steel monofilaments each having a filament diameter of 0.2 mm as a reinforcing element are arranged at a distance S between the groups of 1.28 mm, in which an end count is 24.0 groups per 50 mm.

In the tire of FIG. 3, the belt 2 is comprised of two belt layers in which the monofilaments of the two belt layers are crossed with each other at an inclination angle of 19° with respect to an equatorial plane of the tire and a width of the lower belt layer is somewhat wider than that of the upper belt layer.

For comparison, a belt ply having a closed space 7 as shown in FIG. 5 is used in the belt instead of the belt treat shown in FIG. 6.

Each of the above two tires is inflated under an internal pressure of 1.9 kgf/cm² and run on a drum testing machine at a speed of 80 km/h under a load of 1000 kg over a distance of 60,000 km and thereafter a cracking state created near to the end of the belt in widthwise direction is observed.

In the tire of Example 5, no cracking between the steps of the group occurs, but the length of cracking created from an unadhered portion of the monofilament end is only 3 mm in the longitudinal direction of the monofilament.

On the other hand, cracking is created between the steps of the group and connected to the cracking crated in the adjacent group to grow into a separation failure of 15 mm in length between the belt layers.

EXAMPLE 6

A pneumatic radial tire 20 for truck and bus use having a tire size of 11R22.5 as shown in FIG. 17 is manufactured by using a belt ply as shown in FIG. 18 or 19 in a belt 21 for reinforcing a tread, and a chafer ply as shown in FIG. 20 or 21 in a bead portion reinforcing layer 22, respectively. In the belt ply, plural groups each comprised of a combination of 3-steps and 7-rows made from 21 steel monofilaments of 0.21 mm in diameter as a reinforcing element are arranged at a distance of 1.34 mm to have an end count of 17.8 groups per 50 mm. In the chafer ply, plural groups each comprised of a combination of 2-steps and 4-rows made from 8 steel cords of 1×3×0.19 mm as a reinforcing element are arranged at a distance of 1.29 mm to have an end count of 17.2 groups per 50 mm.

Moreover, the belt 21 of this tire is comprised of four belt layers in which the reinforcing elements of first to fourth belt layers viewing from the tread side are arranged at inclination angles of 18° upward to the left, 18° upward to the left, 18° upward to the right and 52° upward to the right with respect to the equatorial plane of the tire, respectively. On the other hand, the bead portion reinforcing layer 22 is arranged so that assuming an intersection of the reinforcing element to an inner periphery from a rotating center of the tire to a normal flange height, an inclination angle of the reinforcing element with respect to a tangent of the inner periphery is 30°. Moreover, the inclination angle of the reinforcing element is preferably within a range of 10° to 70°.

Each of the above tires is inflated under an internal pressure of 9.0 kgf/cm² and run on a drum testing machine at a speed of 60 km/h under a load of 3500 kg over a distance of 100,000 km and thereafter a cracking state created near to the end of the belt in widthwise direction or the turnup end of the bead portion reinforcing layer is observed.

In the tire using the belt ply shown in FIG. 18, cracking created between the steps of the group inward in the radial direction of the tire is connected to the similar cracking created in the adjacent group to grow the separation failure of 10 mm in length between the belt layers. In the tire using the belt ply shown in FIG. 19, there is no cracking between the steps of the group, but the length of cracking created from an unadhered portion of the monofilament end through pecking is only 3 mm in the longitudinal direction of the monofilament.

In the tire using the chafer ply shown in FIG. 20, cracking created between the steps of the group is connected to the similar cracking created in the adjacent group to grow the separation failure of 10 mm in length in the longitudinal direction of the steel cord. In the tire using the chafer ply shown in FIG. 21, there is no cracking between the steps of the group, but the length of cracking created from an unadhered portion of the steel cord end through pecking is only 1 mm in the longitudinal direction of the steel cord.

EXAMPLE 7

A pneumatic radial tire 20 for truck and bus having a tire size of 11R22.5 as shown in FIG. 17 is manufactured by using a belt ply as shown in FIG. 22 or 23 in a belt 21 for reinforcing a tread, and a ply as shown in FIG. 24 or 25 in a carcass ply 23, respectively. In the belt ply, plural groups each comprised of a combination of 2-steps and 5-rows made from 10 steel cords of 1×3×0.20 mm in diameter as a reinforcing element are arranged at a distance of 1.42 mm to have an end count of 14.1 groups per 50 mm. In the ply, plural groups each comprised of a combination of 2-steps and 4-rows made from 8 steel cords of 1×3×0.19 mm as a reinforcing element are arranged at a distance of 1.29 mm to have an end count of 17.2 groups per 50 mm. Moreover, the inclination angles of the steel cords in the belt 21 are the same as in Example 6.

Each of the above tires is inflated under an internal pressure of 9.0 kgf/cm² and run on a drum testing machine at a speed of 60 km/h under a load of 3500 kg over a distance of 100,000 km and thereafter a cracking state created near to the end of the belt in widthwise direction or the turnup end of the carcass ply is observed.

In the tire using the belt ply shown in FIG. 22, cracking created between the steps of the group inward in the radial direction of the tire is connected to the similar cracking created in the adjacent group to grow the separation failure of 9 mm in length between the belt layers. In the tire using the belt ply shown in FIG. 23, there is no cracking between the steps of the group, but the length of cracking created from an unadhered portion of the steel cord end through pecking is only 3 mm in the longitudinal direction of the steel cord.

In the tire using the ply shown in FIG. 24, cracking created between the steps of the group is connected to the similar cracking created in the adjacent group to grow the separation failure of 3 mm in length in the longitudinal direction of the steel cord. In the tire using the ply shown in FIG. 25, there is no cracking between the steps of the group, but the length of cracking created from an unadhered portion of the steel cord end through pecking is only 1 mm in the longitudinal direction of the steel cord.

EXAMPLE 8

A pneumatic radial tire 1 for a passenger car having a tire size of 185/70R14 as shown in FIG. 3 is manufactured by using a belt ply shown in FIG. 26, 27 or 28 as a belt 2 for reinforcing a tread of this tire. In the belt ply of FIG. 26, plural groups of 2-steps and 2-rows made from 4 steel monofilaments each having a filament diameter of 0.30 mm as a reinforcing element are arranged at a distance S between the groups of 1.31 mm, in which an end count is 26.2 groups per 50 mm. In the belt plies of FIGS. 27 and 28, plural groups of 4-steps and 4-rows made from 8 steel monofilaments having a filament diameter of 0.14 mm are arranged at a distance S of 1.27 mm, in which an end count is 27.3 groups per 50 mm. Moreover, the inclination angle of the reinforcing element in the belt 2 is the same as in Example 5.

Each of the above tires is inflated under an internal pressure of 1.9 kgf/cm² and run on a drum testing machine at a speed of 80 km/h under a load of 1000 kg over a distance of 60,000 km and thereafter a cracking state created near to the end of the belt 2 in widthwise direction is observed.

In the tire using the belt ply of FIG. 26, no cracking between the steps of the group occurs, but the length of cracking created from an unadhered portion of the monofilament end is only 6 mm in the longitudinal direction of the monofilament. On the other hand, the cracking occurs between the steps of the group and connected to the cracking created in the adjacent group to grow into a separation failure of 12 mm in length between the belt layers in the tire using the belt ply of FIG. 27. In the tire using the belt ply of FIG. 28, no cracking between the steps of the group occurs, but the length of cracking created from an unadhered portion of the monofilament end is only 4 mm in the longitudinal direction of the monofilament.

EXAMPLE 9

A pneumatic radial tire 20 for truck and bus having a tire size of 11R22.5 as shown in FIG. 17 is manufactured by using a belt ply as shown in FIG. 29, 30 or 31 in a belt 21 for reinforcing a tread. In the belt ply of FIG. 29, plural groups each comprised of a combination of 2-steps and 2-rows made from 4 steel cords of 1×3×0.25 mm in diameter as a reinforcing element are arranged at a distance of 1.37 mm to have an end count of 20.56 groups per 50 mm. In the belt plies of FIGS. 30 and 31, plural groups each comprised of a combination of 3-steps and 3-rows made from 9 steel cords of 1×3×0.16 mm as a reinforcing element are arranged at a distance of 1.31 mm to have an end count of 21.42 groups per 50 mm. Moreover, the inclination angles of the steel cords in the belt 21 are the same as in Example 7.

Each of the above tires is inflated under an internal pressure of 9.0 kgf/cm$^2$ and run on a drum testing machine at a speed of 60 km/h under a load of 3500 kg over a distance of 100,000 km and thereafter a cracking state created near to the end of the belt in widthwise direction is observed.

In the tire using the belt ply shown in FIG. 29, no cracking between the steps of the group occurs, but the length of cracking created from an unadhered portion of the steel cord end is only 1.5 mm in the longitudinal direction of the steel cord. In the tire using the belt ply of FIG. 30, cracking created between the steps of the group is connected to the similar cracking created in the adjacent group to grow the separation failure of 3 mm in length between the belt layers. In the tire using the belt ply of FIG. 31, there is no cracking between the steps of the group, but the length of cracking created from an unadhered portion of the steel cord end through pecking is only 1.3 mm in the longitudinal direction of the steel cord.

EXAMPLE 10

A pneumatic radial tire 20 for truck and bus having a tire size of 11R22.5 as shown in FIG. 17 is manufactured by using a belt ply as shown in FIG. 32, 33 or 34 in a belt 21 for reinforcing a tread. In the belt ply of FIG. 32, plural groups each comprised of a combination of 2-steps and 2-rows made from 4 steel cords of 1×3×0.25 mm in diameter as a reinforcing element are arranged at a distance of 1.37 mm to have an end count of 20.56 groups per 50 mm. In the belt plies of FIGS. 33 and 34, plural groups each comprised of a combination of 4-steps and 4-rows made from 16 steel cords of 1×3×0.12 mm as a reinforcing element are arranged at a distance of 1.31 mm to have an end count of 21.43 groups per 50 mm. Moreover, the inclination angles of the steel cords in the belt 21 are the same as in Example 7.

Each of the above tires is inflated under an internal pressure of 9.0 kgf/cm$^2$ and run on a drum testing machine at a speed of 60 km/h under a load of 3500 kg over a distance of 100,000 km and thereafter a cracking state created near to the end of the belt in widthwise direction is observed.

In the tire using the belt ply shown in FIG. 32, no cracking between the steps of the group occurs, but the length of cracking created from an unadhered portion of the steel cord end is only 1.3 mm in the longitudinal direction of the steel cord. In the tire using the belt ply of FIG. 33, cracking created between the steps of the group is connected to the similar cracking created in the adjacent group to grow the separation failure of 2.5 mm in length between the belt layers and also the durability is degraded due to the number of steps. In the tire using the belt ply of FIG. 34, there is no cracking between the steps of the group, but the length of cracking created from an unadhered portion of the steel cord end through pecking is only 1.4 mm in the longitudinal direction of the steel cord.

As mentioned above, the invention can effectively prevent the growth and propagation of cracking created near to the ends of the reinforcing elements in the tire component causing separation failure at the widthwise end of the tire component in the conventional pneumatic tire. Also, cracking between the reinforcing elements can be controlled even if the number of the reinforcing elements is increased in the group of the rubber-coated layer. As a result, the invention can provide pneumatic tires having very excellent durability.

What is claimed is:

1. A pneumatic tire comprising: various tire components each comprised of a rubber-coated layer containing a given number of reinforcing elements separately arranged in parallel with each other therein, wherein the reinforcing elements corresponding to not less than 30% of all reinforcing elements included in at least one of the rubber-coated layers are divided into plural groups each consisting of a combination of m-steps and n-rows viewing in a thickness direction of the rubber-coated layer, in which m is an integer of 2 or more and n is an integer of 3 or more representing the number of the reinforcing elements, a distance between mutually adjacent and opposite reinforcing elements, which are not grouped with each other, is wider than a distance between mutually adjacent reinforcing elements in the group and distances between any four mutually adjacent reinforcing elements within each of said groups are not the same in all of said groups, and wherein the reinforcing elements corresponding to not less than 30% of all reinforcing elements included in the at least one of the rubber-coated layers are divided into plural groups each consisting of a combination of at least 2-steps and 4-rows in the thickness direction of the layer, and at least one non-contact region communicating to an outside of the group is formed among adjacent four reinforcing elements constituting a combination of 2-steps and 2-rows in the group.

2. A pneumatic tire according to claim 1, wherein the tire component in which is located the at least one of the rubber-coated layers is a belt serving to reinforce a tread portion, at least one carcass ply wound around each of a pair of bead cores from an inside of the tire toward an outside thereof, or at least one bead portion reinforcing layer folded about each bead core from the inside of the tire toward the outside thereof and extending along the turnup portion of the carcass ply upward in the radial direction of the tire.

3. A pneumatic tire according to claim 1, wherein the reinforcing elements are steel monofilaments.

4. A pneumatic tire according to claim 1, wherein the reinforcing elements are steel cords.

* * * * *